(12) United States Patent
Ide et al.

(10) Patent No.: US 7,809,286 B2
(45) Date of Patent: Oct. 5, 2010

(54) OPTICAL RECEIVER FOR REGENERATION OF OPTICAL SIGNAL

(75) Inventors: Satoshi Ide, Kawasaki (JP); Tetsuji Yamabana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/475,833

(22) Filed: Jun. 1, 2009

(65) Prior Publication Data

US 2009/0232519 A1    Sep. 17, 2009

Related U.S. Application Data

(62) Division of application No. 11/341,535, filed on Jan. 30, 2006, now abandoned.

(30) Foreign Application Priority Data

Oct. 11, 2005  (JP) .............................. 2005-296535

(51) Int. Cl.
*H04B 10/06* (2006.01)
(52) U.S. Cl. ........................ 398/209; 398/202; 398/208; 398/210; 398/212; 398/213
(58) Field of Classification Search ................. 398/137, 398/202, 208–214; 330/308, 72, 136
See application file for complete search history.

(56) References Cited

U.S. PATENT DOCUMENTS

| 5,677,779 | A | * | 10/1997 | Oda et al. .................... 398/137 |
| 6,151,150 | A | * | 11/2000 | Kikuchi ...................... 398/209 |
| 6,229,631 | B1 |  | 5/2001 | Sato et al. |
| 6,359,715 | B1 | * | 3/2002 | Imajo ......................... 398/210 |
| 6,915,076 | B1 | * | 7/2005 | Mittal et al. .................. 398/38 |
| 7,382,987 | B2 |  | 6/2008 | Misaizu et al. |
| 2004/0062556 | A1 | * | 4/2004 | Kubo et al. ................... 398/208 |
| 2004/0253003 | A1 | * | 12/2004 | Farmer et al. ................ 398/214 |
| 2005/0062530 | A1 | * | 3/2005 | Bardsley et al. .............. 330/136 |
| 2005/0078966 | A1 | * | 4/2005 | Misaizu et al. ............... 398/214 |
| 2005/0149791 | A1 |  | 7/2005 | Nishimoto |

FOREIGN PATENT DOCUMENTS

| JP | 60-197051 | 10/1985 |
| JP | 2-288640 | 11/1990 |
| JP | 6-334609 | 12/1994 |

(Continued)

OTHER PUBLICATIONS

U.S. Appl. No. 11/341,535, filed Jan. 30, 2006, Satoshi Ide, et al.

(Continued)

*Primary Examiner*—Li Liu
(74) *Attorney, Agent, or Firm*—Staas & Halsey LLP

(57) ABSTRACT

An optical receiver includes: a converting unit that converts an optical signal into an electrical signal; an amplifying unit that amplifies the electrical signal; a regenerating unit that regenerates the amplified electrical signal; a correcting unit that performs correction of an error included in the regenerated electrical signal; a monitoring unit that performs monitoring of an optical current flowing through the converting unit; and a control unit that calculates a decision threshold based on a result of the correction and a result of the monitoring.

2 Claims, 16 Drawing Sheets

FOREIGN PATENT DOCUMENTS

| | | |
|---|---|---|
| JP | 8-307358 | 11/1996 |
| JP | 10-126349 | 5/1998 |
| JP | 10-209975 | 8/1998 |
| JP | 2000-134160 | 5/2000 |
| JP | 2005-117464 | 4/2005 |
| WO | 2004/051950 | 6/2004 |

OTHER PUBLICATIONS

Japanese Office Action issued on Dec. 4, 2008 in corresponding Japanese Patent Application 2005-296535.

Japanese Patent Office Notice of Rejection mailed Mar. 2, 2010 for corresponding Japanese Patent Application No. 2005-296535.

* cited by examiner

OPTICAL RECEIVER FOR REGENERATION OF OPTICAL SIGNAL

CROSS-REFERENCE TO RELATED APPLICATIONS

This application is a divisional application of U.S. Ser. No. 11/341,535 filed Jan. 30, 2006 now abandoned, the disclosure of which is incorporated herein by reference in its entirety.

This application is based upon and claims the benefit of priority from the prior Japanese Patent Application No. 2005-296535, filed on Oct. 11, 2005, the entire contents of which are incorporated herein by reference.

BACKGROUND OF THE INVENTION

1. Field of the Invention

The present invention relates to an optical receiver that regenerates data from an optical signal based on an optimal decision threshold that is set dynamically according to the receiving power of the optical signal.

2. Description of the Related Art

With the popularization of the Internet in recent years, data traffic in communication networks has been significantly increasing. To cope with the increase of data traffic, an ultra-broadband photonic network employing a dense wavelength division multiplexing (DWDM) technology has been developed. An ultra-long-haul data communication can be performed with DWDM transmission, which uses an optical fiber including several tens of wavelength channels and a plurality of optical amplifiers connected in cascade on the optical fiber. In such ultra-long-haul data communication, however, the interference between wavelength channels significantly increases and the optical signal to noise ratio (OSNR) is seriously deteriorated due to optical noise from the optical amplifiers. Especially, data error due to the optical noise has become a bottleneck for DWDM transmission because it cannot be prevented by improving the sensitivity of an optical receiver. Therefore, to overcome this optical noise bottleneck an improvement of the error correction technology performed in the optical receiver is strongly needed.

If the optical receiver corrects the data error using forward error correction (FEC), a bit error rate (BER) of the optical receiver can be obtained from a result of the error correction. On the other hand, the receiving characteristics of the optical receiver can be improved by optimizing its decision threshold that varies depending on the OSNR or a state of chromatic dispersion due to long-haul transmission. Therefore, the performance of the optical receiver can be improved by performing a feedback control based on the BER and by adjusting the decision threshold to the optimal level.

FIG. 17 is a block diagram of a conventional optical receiver for DWDM transmission. As shown in FIG. 17, an optical receiver 1 includes a photodiode (PD) 2, a trans-impedance amplifier (TIA) functioning as a preamplifier 3, a variable-gain amplifier 4, a gain-control amplifier 5, a clock/data recovery (CDR) 6, a forward error correction (FEC) unit 7, a controller 8, and a digital-to-analog converter (DAC) 9.

The PD 2 converts an optical input signal into an electrical signal. The preamplifier 3, the variable-gain amplifier 4, and the gain-control amplifier 5 perform reshaping of the electrical signal. The CDR 6 performs regeneration and retiming of the reshaped electrical signal. The FEC 7, the controller 8, and the DAC 9 are provided to adjust the decision threshold according to the amplitude of the reshaped electrical signal as shown in FIG. 18 (see, for example, Japanese Patent Application Laid-Open No. H2-288640).

However, the optical receiver 1 needs large circuit size and its control becomes complicated because it has to perform variable-gain control to keep constant reshaped electrical signal. Furthermore, the gain of the preamplifier 3 needs to be small to prevent saturation of amplitude when the input power of optical signal increases, thereby making it difficult to improve the sensitivity of the optical receiver 1.

On the other hand, another optical receiver achieving high sensitivity with a simple configuration has also been suggested. The optical receiver includes a high-gain limiting amplifier, and a direct current (DC) feedback circuit for controlling the DC level of the positive signal and the negative signal output from the limiting amplifier. The sensitivity of the optical receiver can be improved by increasing the gain of the preamplifier, while reducing the circuit size of the optical receiver.

In such an optical receiver, however, the relation between the decision threshold of optical receiver and a feed-backed threshold control signal from an forward error correction (FEC) unit is not unique, because the condition of signal in the optical receiver greatly differs depending on, for example, the receiving power of the signal. The limiting amplifier performs a complex operation in the DC feedback control. Specifically, as long as the amplitude of an input signal is less than predetermined limiting amplitude, the limiting amplifier performs a linear operation and linearly amplifies the input signal. On the other hand, when the amplitude of the input signal reaches the limiting amplitude, the limiting amplifier performs a limiting operation and extracts a part of the input signal near cross points. The wide dynamic range of the receiving power makes it difficult to set an appropriate decision threshold, using the threshold control signal, for respective input power. As a result, a sufficient error correction cannot be achieved.

SUMMARY OF THE INVENTION

It is an object of the present invention to at least solve the above problems in the conventional technology.

An optical receiver according to an aspect of the present invention includes: a converting unit that converts an optical signal into an electrical signal; an amplifying unit that amplifies the electrical signal; a regenerating unit that regenerates the electrical signal amplified by the amplifying unit; a correcting unit that performs correction of an error included in the electrical signal regenerated by the regenerating unit; a monitoring unit that performs monitoring of an photo current flowing through the converting unit; and a control unit that calculates a decision threshold based on a result of the correction and a result of the monitoring.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained in detail with reference to the accompanying drawings.

Figure 1:
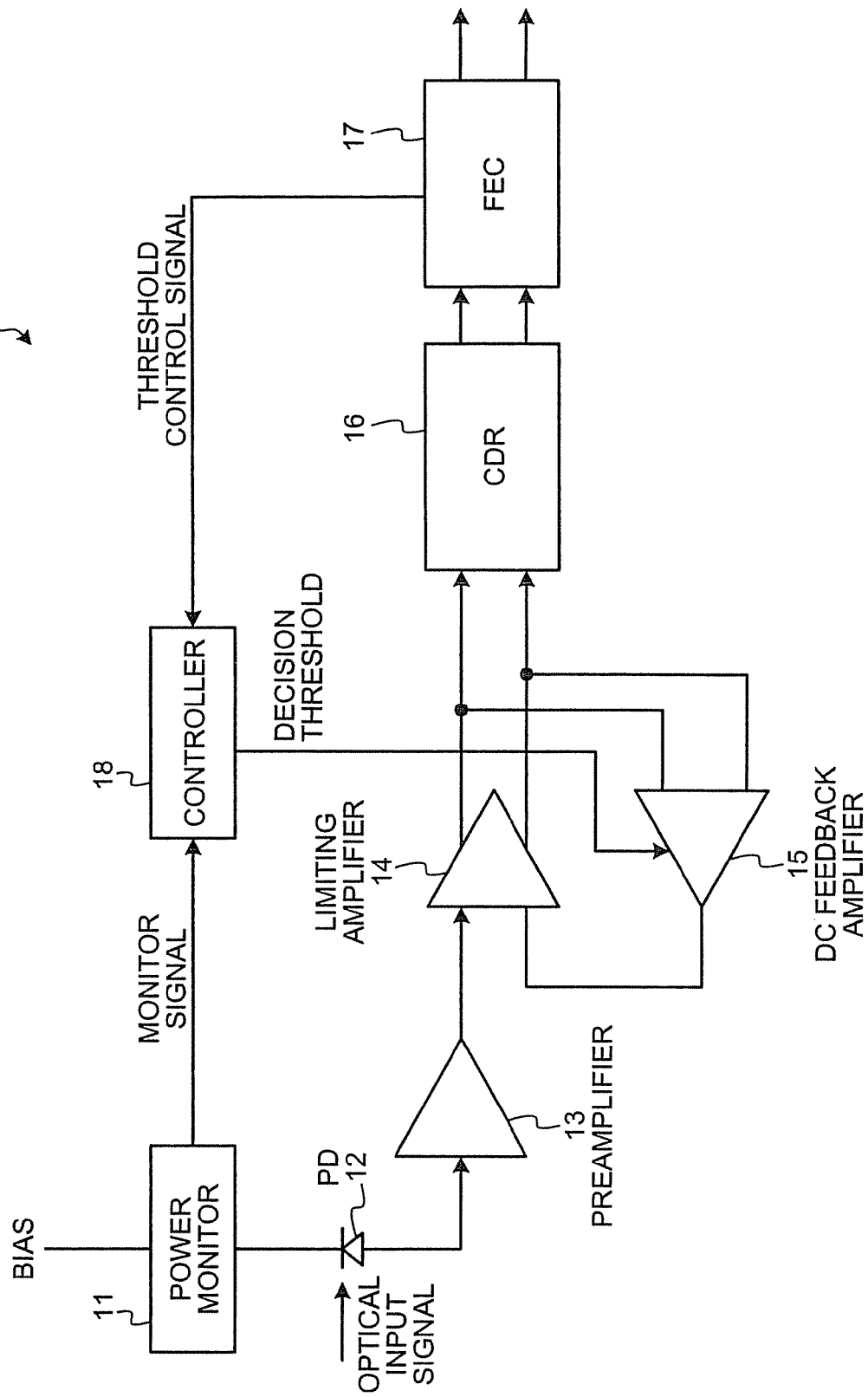
FIG. 1 is a block diagram of an optical receiver according to a first embodiment of the present invention.

FIG. 1 is a block diagram of an optical receiver according to a first embodiment of the present invention. An optical receiver 10 includes a power monitor 11, a photodiode (PD) 12, a preamplifier 13, a limiting amplifier 14, a direct current (DC) feedback amplifier 15, a clock/data recovery (CDR) 16, a forward error correction (FEC) unit 17, and a controller 18.

The PD 12 converts an optical input signal into an electrical signal. The preamplifier 13 and the limiting amplifier 14 amplify the electrical signal. An output signal from the preamplifier 13 is input to one of the input terminals of the limiting amplifier 14. The DC feedback amplifier 15 feedbacks an output signal from the limiting amplifier 14 back to the other input terminal of the limiting amplifier 14. Thus, the DC feedback amplifier 15 controls the DC level of the positive signal and the negative signal output from the limiting amplifier 14. The CDR 16 regenerates and retimes the output signal from the limiting amplifier 14.

The FEC 17 corrects data error included in the regenerated signal. The power monitor 11 monitors a photo current flowing through the PD 12. The controller 18 calculates an optimal decision threshold according to the receiving power and the bit error rate. Specifically, the controller 18 calculates the optimal decision threshold based on a monitor signal from the power monitor 11, which corresponding to the monitored reception power, and a threshold control signal from the FEC 17, which corresponding to the bit error rate. The calculated decision threshold is converted into an analog signal in the controller 18, and is set to the DC feedback amplifier 15.

Figure 2:
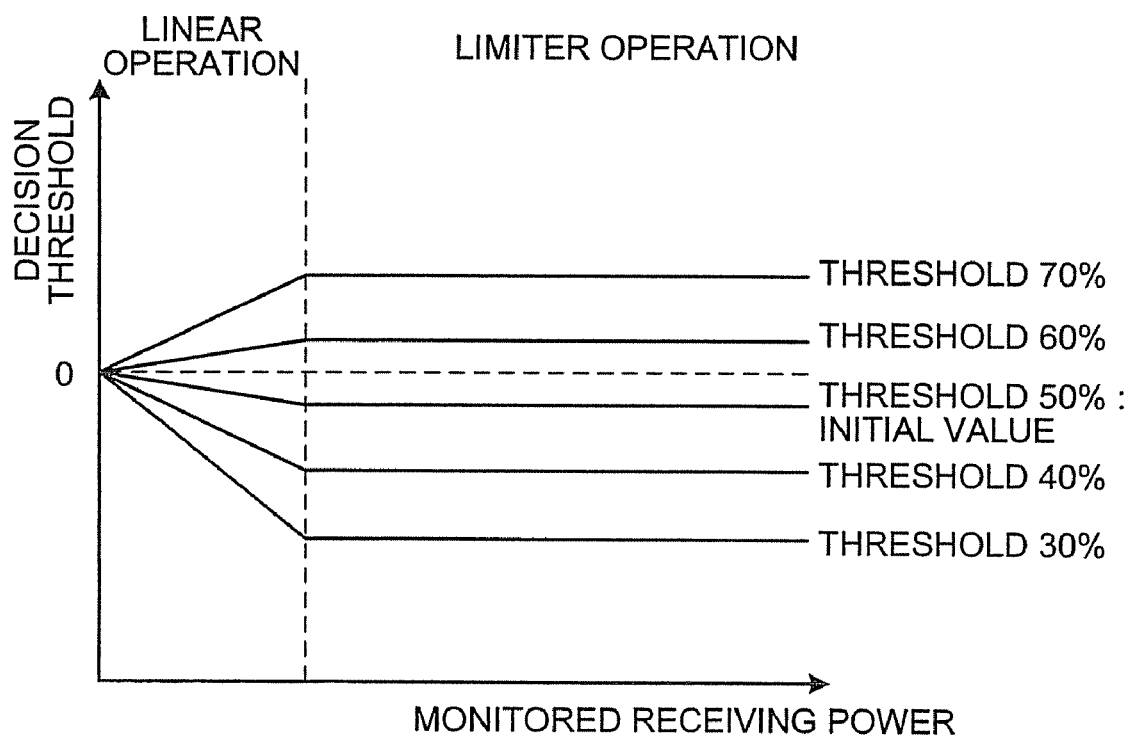
FIG. 2 is a schematic illustrating an operation of the optical receiver shown in FIG. 1.
Figure 3:
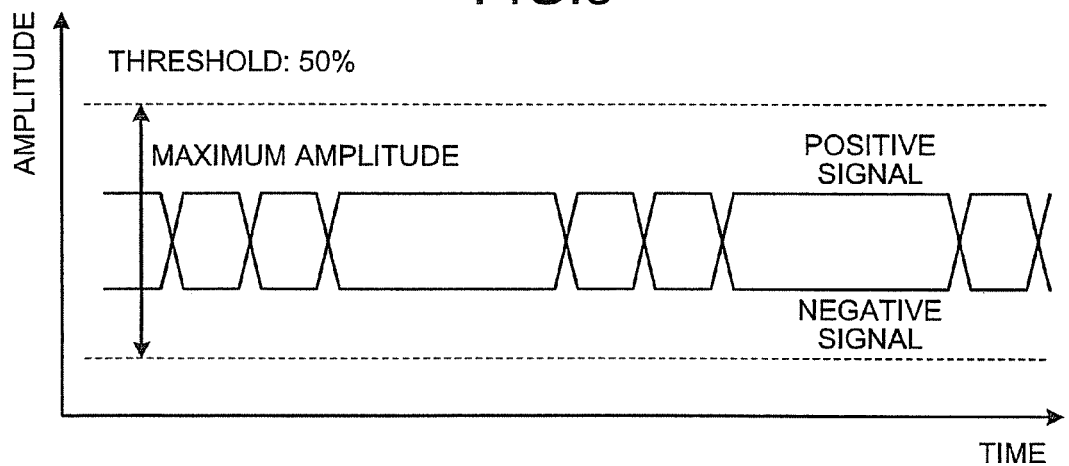
FIGS. 3 to 6 are waveform diagrams illustrating the output amplitude of a limiting amplifier shown in FIG. 1.
Figure 4:
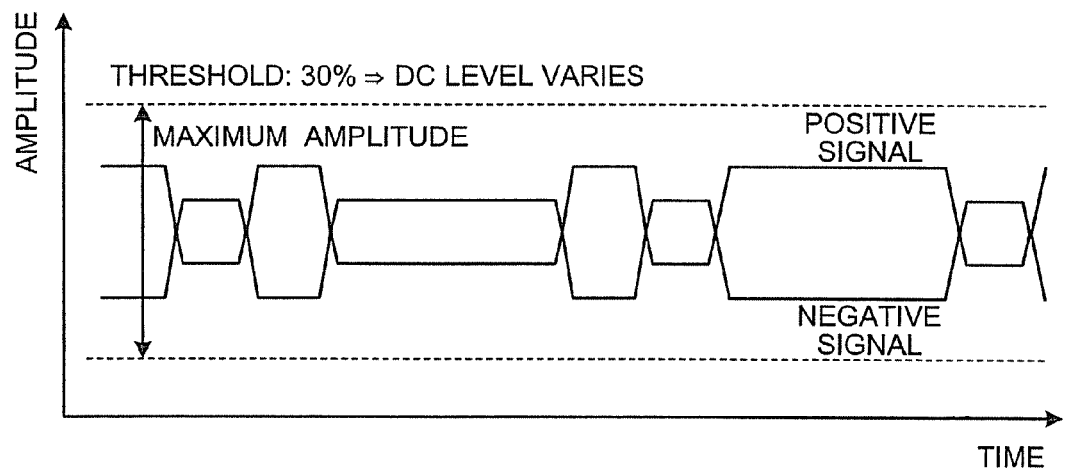
Figure 5:
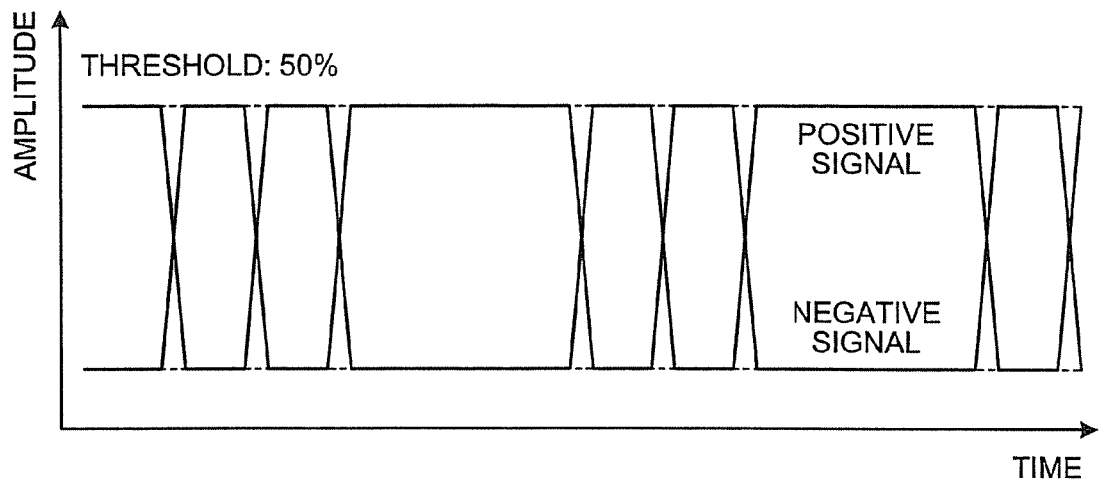
Figure 6:
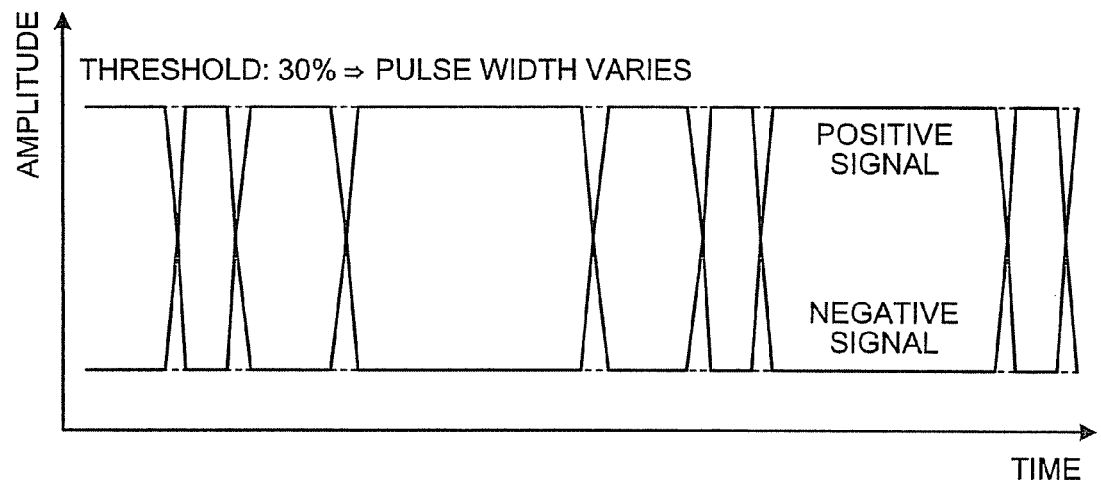

FIG. 2 is a schematic illustrating an operation of the optical receiver 10. FIGS. 3 and 4 are waveform diagrams illustrating the output amplitude of the limiting amplifier 14 performing the linear operation with the decision threshold being set at 50% and 30%, respectively. FIGS. 5 and 6 are waveform diagrams illustrating the output amplitude of the limiting amplifier 14 performing the limiting operation with the decision threshold being set at 50% and 30%, respectively. The above decision thresholds (%) are normalized with respect to the signal amplitude.

As shown in FIGS. 3 to 6, the limiting amplifier 14 performs the linear operation and the limiting operation. In the linear operation, the decision threshold is changed in proportion to the reception power as shown in FIG. 2 because the signal level of the positive signal and the negative signal changes due to the DC feedback control. On the other hand, in the limiting operation, the signal level does not change but the pulse width of the signal changes according to the rising edge timing and the falling edge timing of the signal. Therefore, as long as the rising and falling timings are stable in the signal, the decision threshold is kept substantially constant in the limiting operation as shown in FIG. 2.

The controller 18 calculates an optimal decision threshold based on the above operations of the limiting amplifier 14. The DC feedback amplifier 15 controls the DC level of the feedback signal to the limiting amplifier 14 based on the decision threshold set by the controller 18, to control the DC level of the positive signal and the negative signal output from the limiting amplifier 14.

Figure 7:
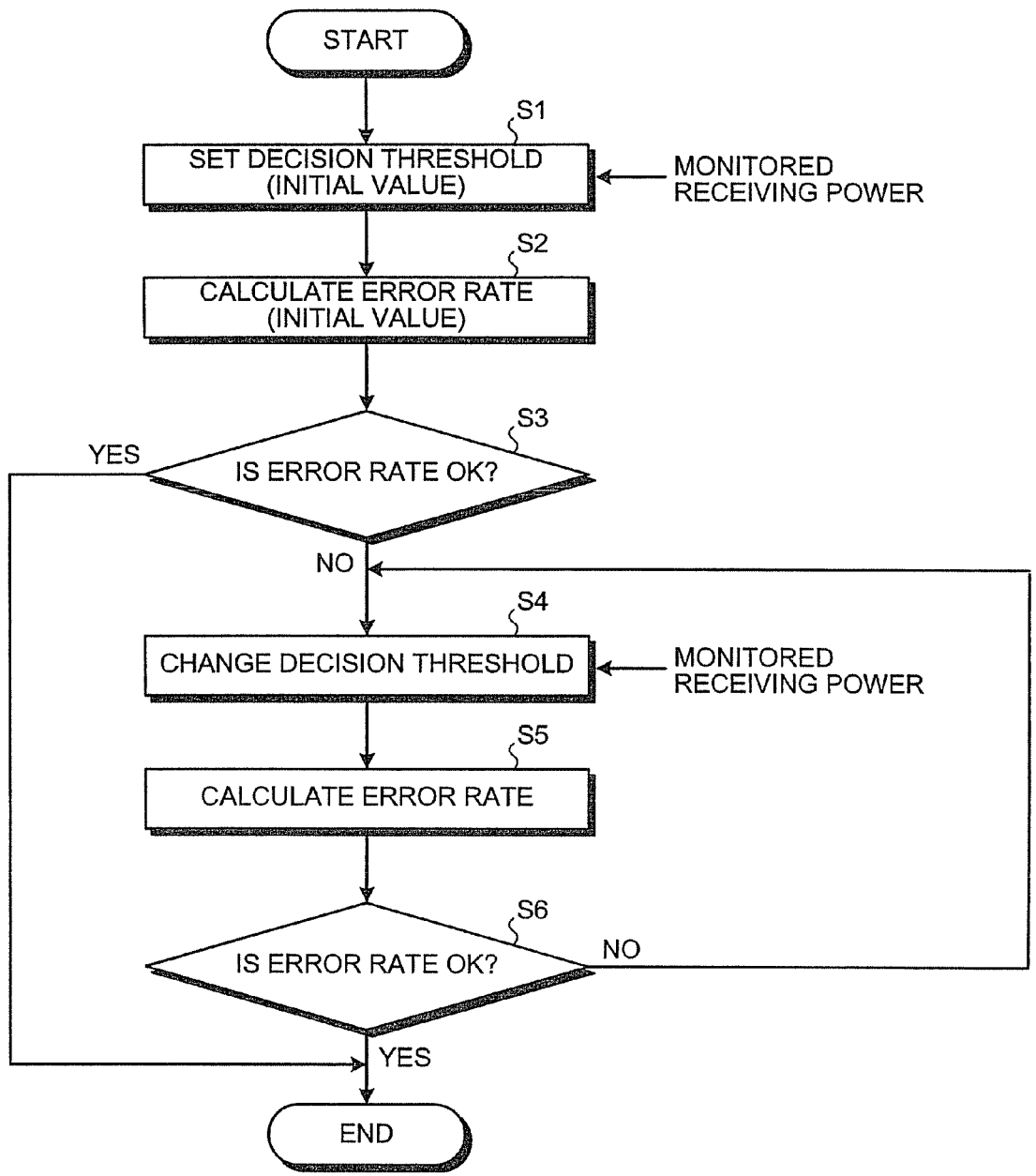
FIG. 7 is a flowchart of a decision threshold setting process according to the first embodiment.

FIG. 7 is a flowchart of a decision threshold setting process performed by the controller 18. The controller 18 receives the monitor signal indicating the receiving power of an optical signal from the power monitor 11, and sets an initial value of the decision threshold (step S1). Then, the controller 18 calculates an initial value of the error rate based on the initial value of the decision threshold and the threshold control signal from the FEC 17 (step S2). The controller 18 determines whether the error rate satisfies a predetermined condition (step S3). When the error rate satisfies the condition ("YES" at step S3), the process is completed.

On the other hand, when the error rate does not satisfy the condition ("NO" at step S3), the controller 18 receives updated monitor signal from the power monitor 11, and changes the decision threshold (step S4). Then, the controller 18 calculates the error rate (step S5), and determines whether the error rate satisfies the condition (step S6). When the error rate does not satisfy the condition ("NO" at step S6), the process returns to step S4. The process from step S4 to step S6 is repeated until an error rate that satisfies the condition is obtained. When the error rate satisfies the condition ("YES" at step S6), the process is completed.

Figure 8:
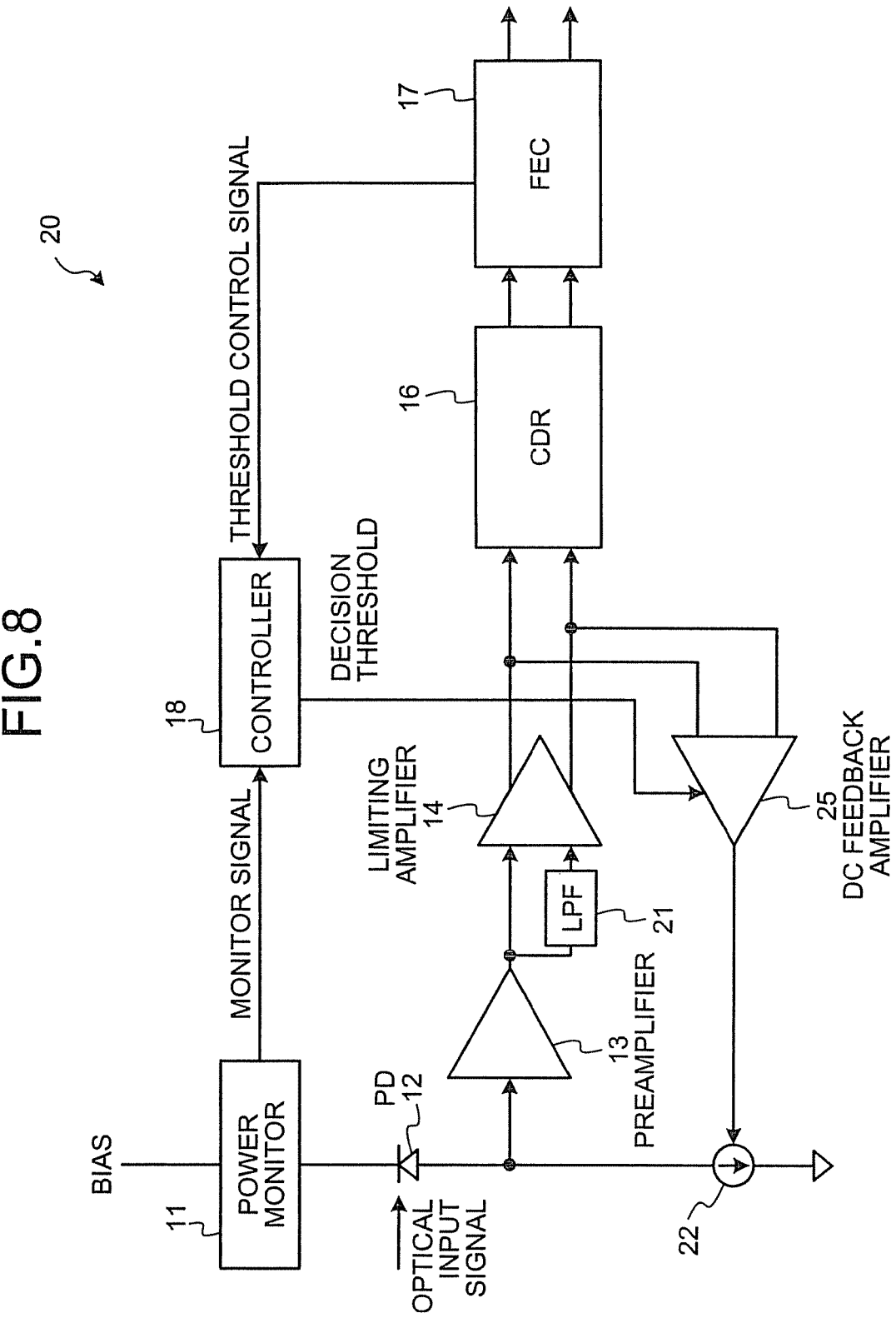
FIG. 8 is a block diagram of an optical receiver according to a second embodiment of the present invention.

FIG. 8 is a block diagram of an optical receiver according to a second embodiment of the present invention. An optical receiver 20 shown in FIG. 8 performs a DC feedback control different from the DC feedback control explained in the first embodiment. Specifically, the optical receiver 20 includes a DC feedback amplifier 25 instead of the DC feedback amplifier 15 shown in FIG. 1. The output signals from the limiting amplifier 14 are input to the DC feedback amplifier 25. The output signal from the DC feedback amplifier 25 controls a current source 22 connected to the PD 12 and the preamplifier 13.

In a similar manner as in the first embodiment, the decision threshold calculated by the controller 18 is set in the DC feedback amplifier 25. The output signal from the preamplifier 13 is input to one of the input terminals of the limiting amplifier 14 as it is, and also input to the other input terminal through a low pass filter (LPF) 21 that extracts the DC level of the output signal of preamplifier.

The DC feedback amplifier 25 performs a DC feedback control based on the decision threshold set by the controller 18, to control the DC level of the positive signal and the negative signal that are output from the preamplifier 13 and input to the limiting amplifier 14.

Figure 9:
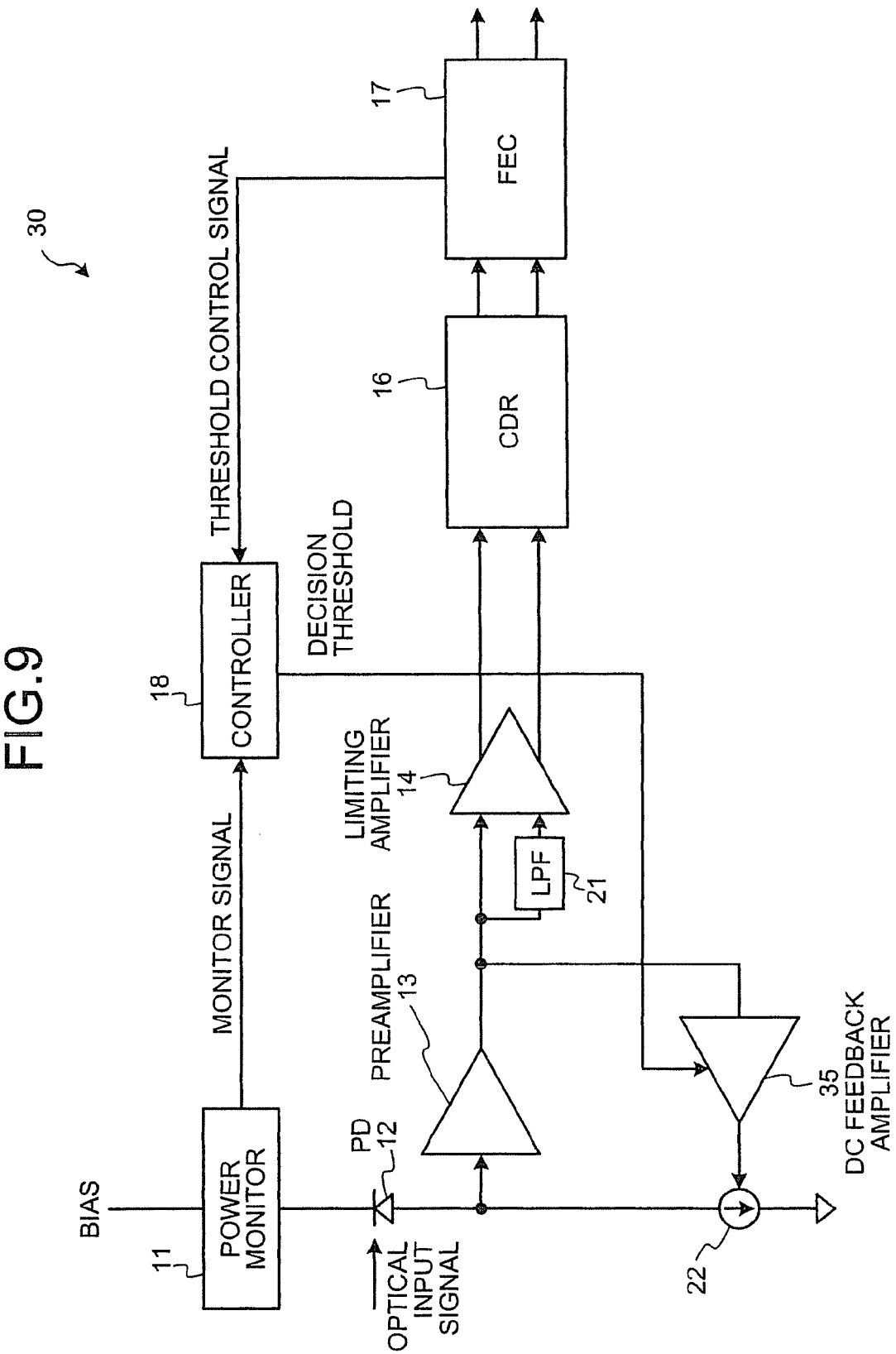
FIG. 9 is a block diagram of an optical receiver according to a third embodiment of the present invention.

FIG. 9 is a block diagram of an optical receiver according to a third embodiment of the present invention. An optical receiver 30 shown in FIG. 9 performs a DC feedback control different from the DC feedback control explained in the second embodiment. Specifically, the optical receiver 30 includes a DC feedback amplifier 35 instead of the DC feedback amplifier 25 shown in FIG. 8. The output signal from the preamplifier 13 is input to the DC feedback amplifier 35. The output signal from the DC feedback amplifier 35 controls the current source 22.

In a similar manner as in the second embodiment, the decision threshold calculated by the controller 18 is set in the DC feedback amplifier 35. However, in the third embodiment, the output signal from the preamplifier 13 is subjected to a feedback control performed by the DC feedback amplifier 35, to control the DC level of the positive signal and the negative signal to be input to the limiting amplifier 14.

Figure 10:
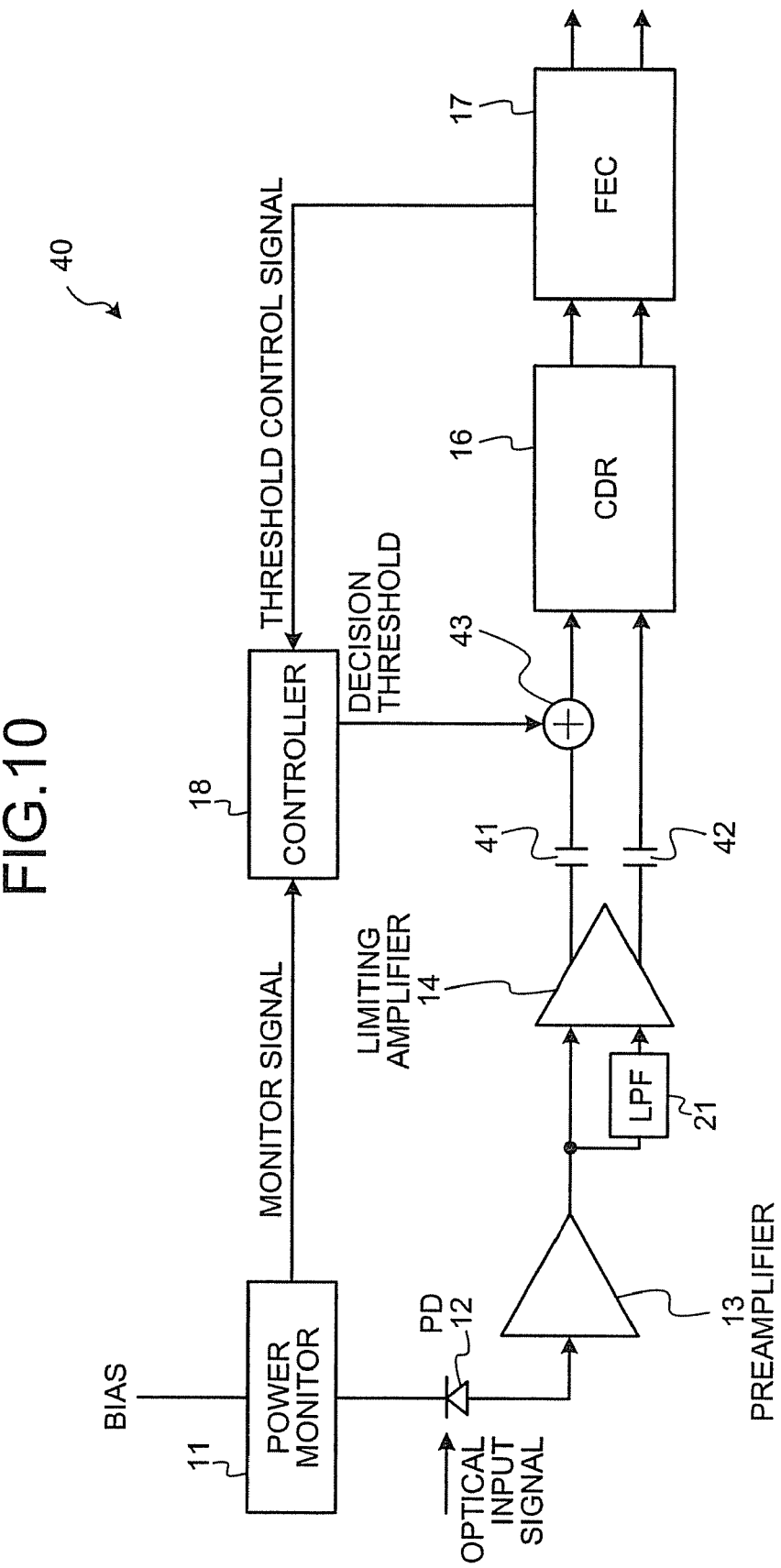
FIG. 10 is a block diagram of an optical receiver according to a fourth embodiment of the present invention.

FIG. 10 is a block diagram of an optical receiver according to a fourth embodiment of the present invention. An optical receiver 40 shown in FIG. 10 controls, instead of performing the DC feedback control, a DC level of the output signal from the limiting amplifier 14 directly based on the decision threshold calculated by the controller 18. The limiting amplifier 14 and the CDR 16 are AC-coupled via capacitors 41 and 42, and the decision threshold calculated by the controller 18 is input to one of the input terminals of the CDR 16 by an adder 43.

Figure 11:
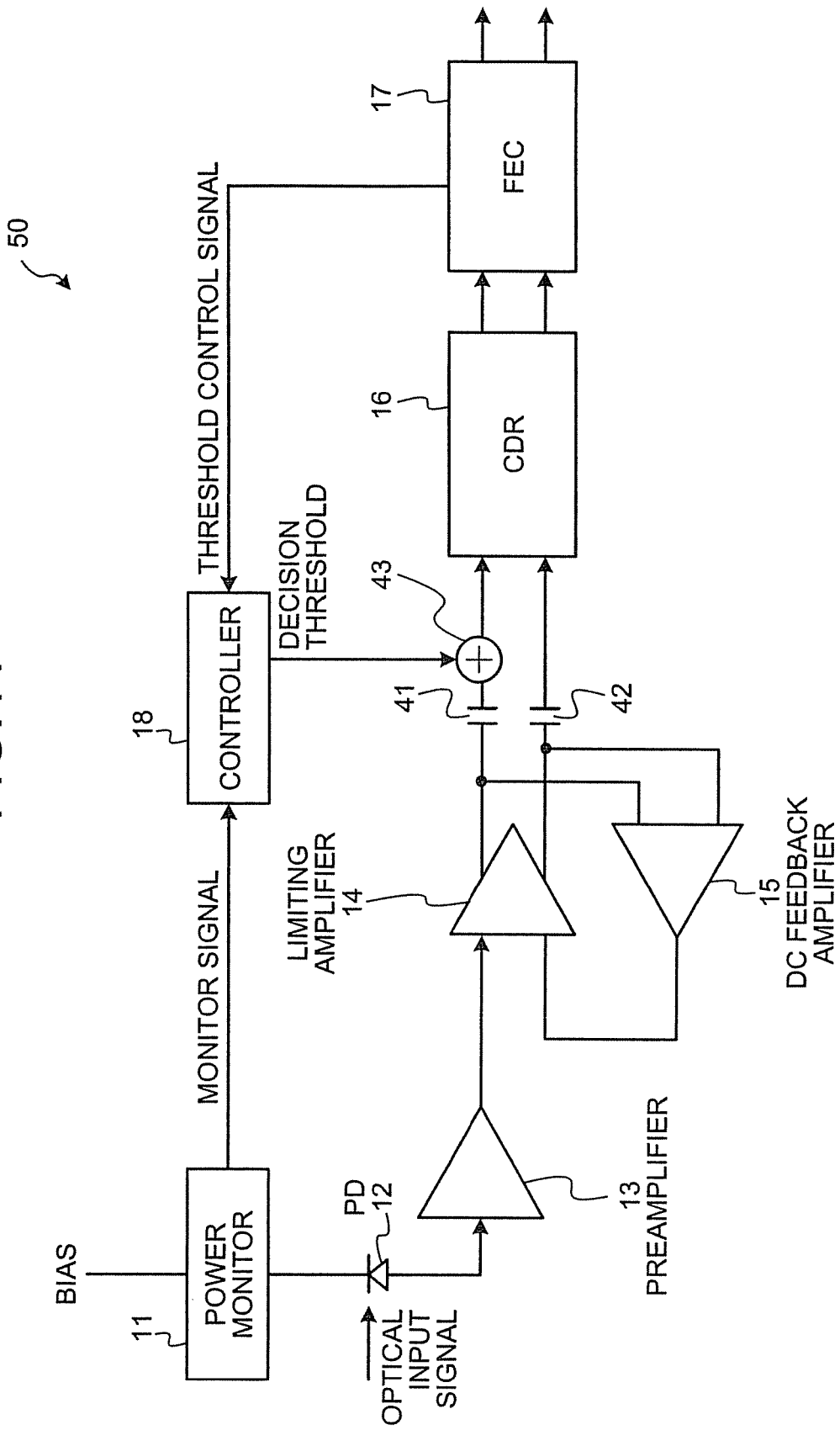
FIG. 11 is a block diagram of an optical receiver according to a fifth embodiment of the present invention.

FIG. 11 is a block diagram of an optical receiver according to a fifth embodiment of the present invention. The configuration of an optical receiver 50 shown in FIG. 11 is similar to that of the optical receiver 40 according to the fourth embodiment (see FIG. 10). However, unlike the optical receiver 40, the optical receiver 50 performs the same DC feedback control as that of the first embodiment (see FIG. 1). Specifically, the DC feedback amplifier 15 of the optical receiver 50 feeds back the output signal from the limiting amplifier 14 to one of the input terminals of the limiting amplifier 14. However, the decision threshold calculated by the controller 18 is not input to the DC feedback amplifier 15.

Figure 12:
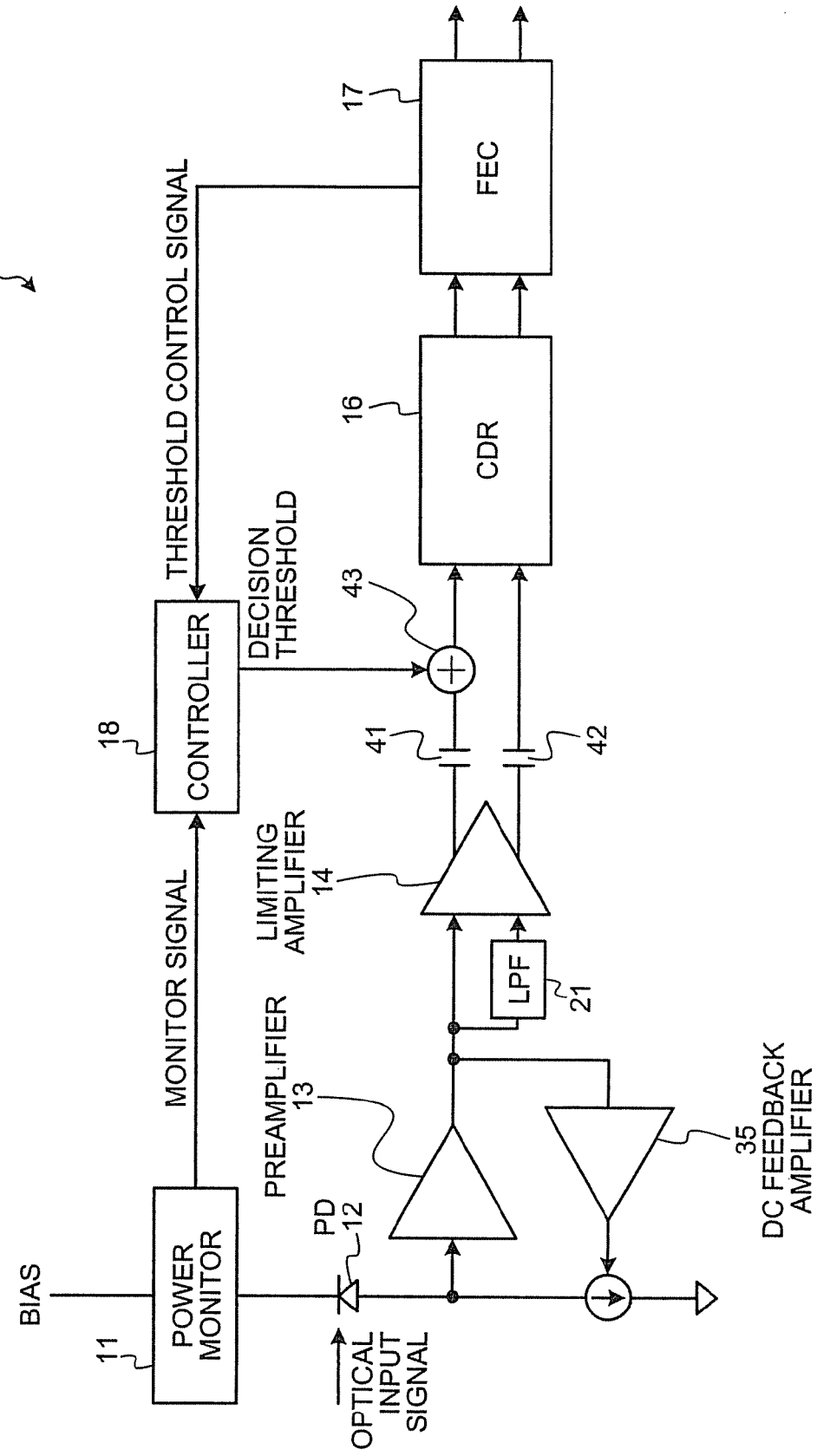
FIG. 12 is a block diagram of an optical receiver according to a sixth embodiment of the present invention.

FIG. 12 is a block diagram of an optical receiver according to a sixth embodiment of the present invention. The configuration of an optical receiver 60 shown in FIG. 12 is similar to that of the optical receiver 40 according to the fourth embodiment (see FIG. 10). However, unlike the optical receiver 40, the optical receiver 60 performs the same DC feedback control as that of the third embodiment (see FIG. 9). Specifically, the DC feedback amplifier 35 of the optical receiver 60 controls the current source 22 connected to the PD 12 and the preamplifier 13 by inputting the output signal from the preamplifier 13 to the current source 22. However, the decision threshold calculated by the controller 18 is not input to the DC feedback amplifier 35.

Figure 13:
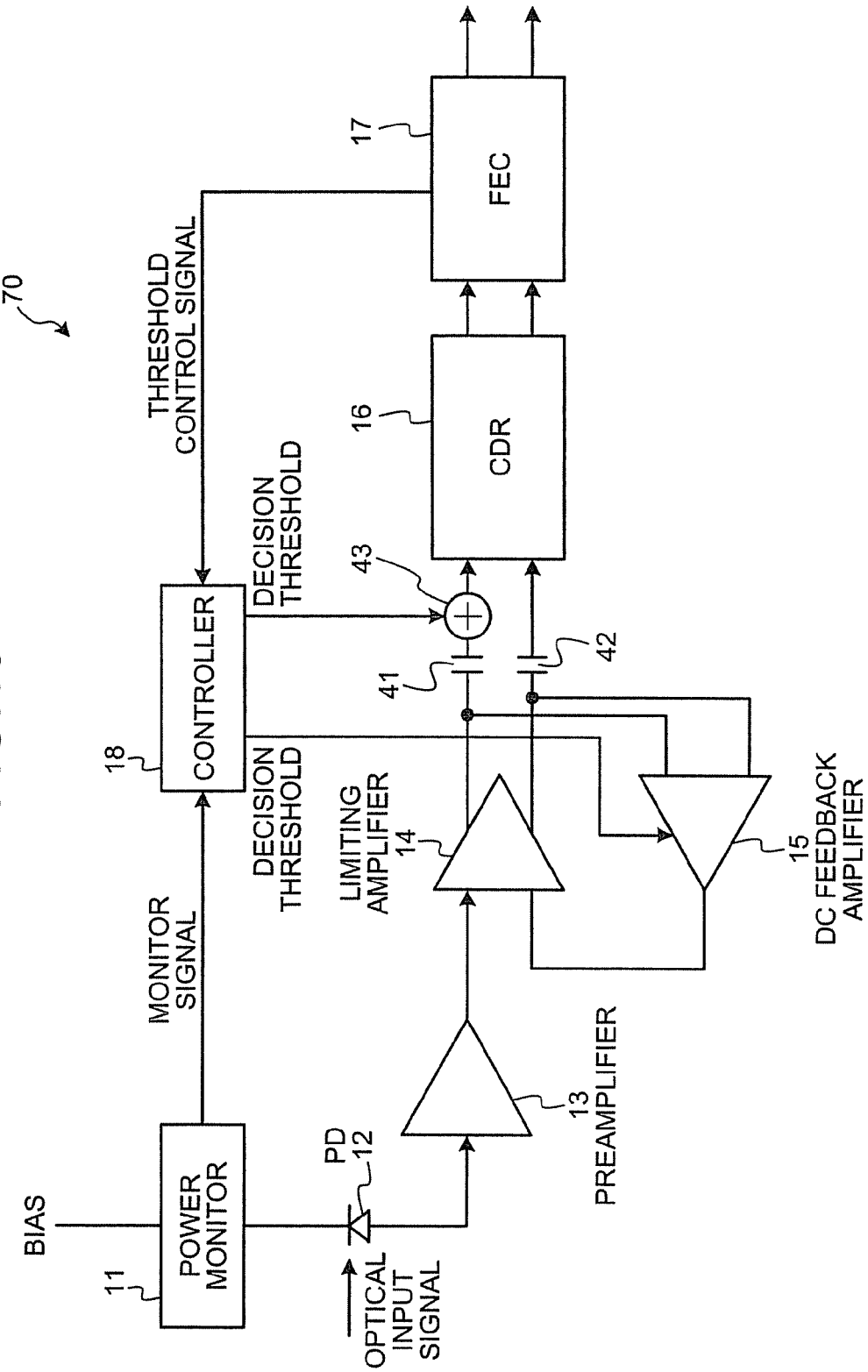
FIG. 13 is a block diagram of an optical receiver according to a seventh embodiment of the present invention.

FIG. 13 is a block diagram of an optical receiver according to a seventh embodiment of the present invention. The configuration of an optical receiver 70 shown in FIG. 13 is same as that of the optical receiver 50 according to the fifth embodiment (see FIG. 11). However, in the optical receiver 70, the decision threshold calculated by the controller 18 is input to the DC feedback amplifier 15 as in the optical receiver 10 according to the first embodiment (see FIG. 1). In other words, in the optical receiver 70, the DC level of the positive signal and the negative signal output from the limiting amplifier 14 is controlled at both sides of the limiting amplifier 14 (that is, the input side and the output side). According to the seventh embodiment, the decision threshold can be adjusted appropriately even when the relation between the reception power and the decision threshold is more complicated.

Figure 14:
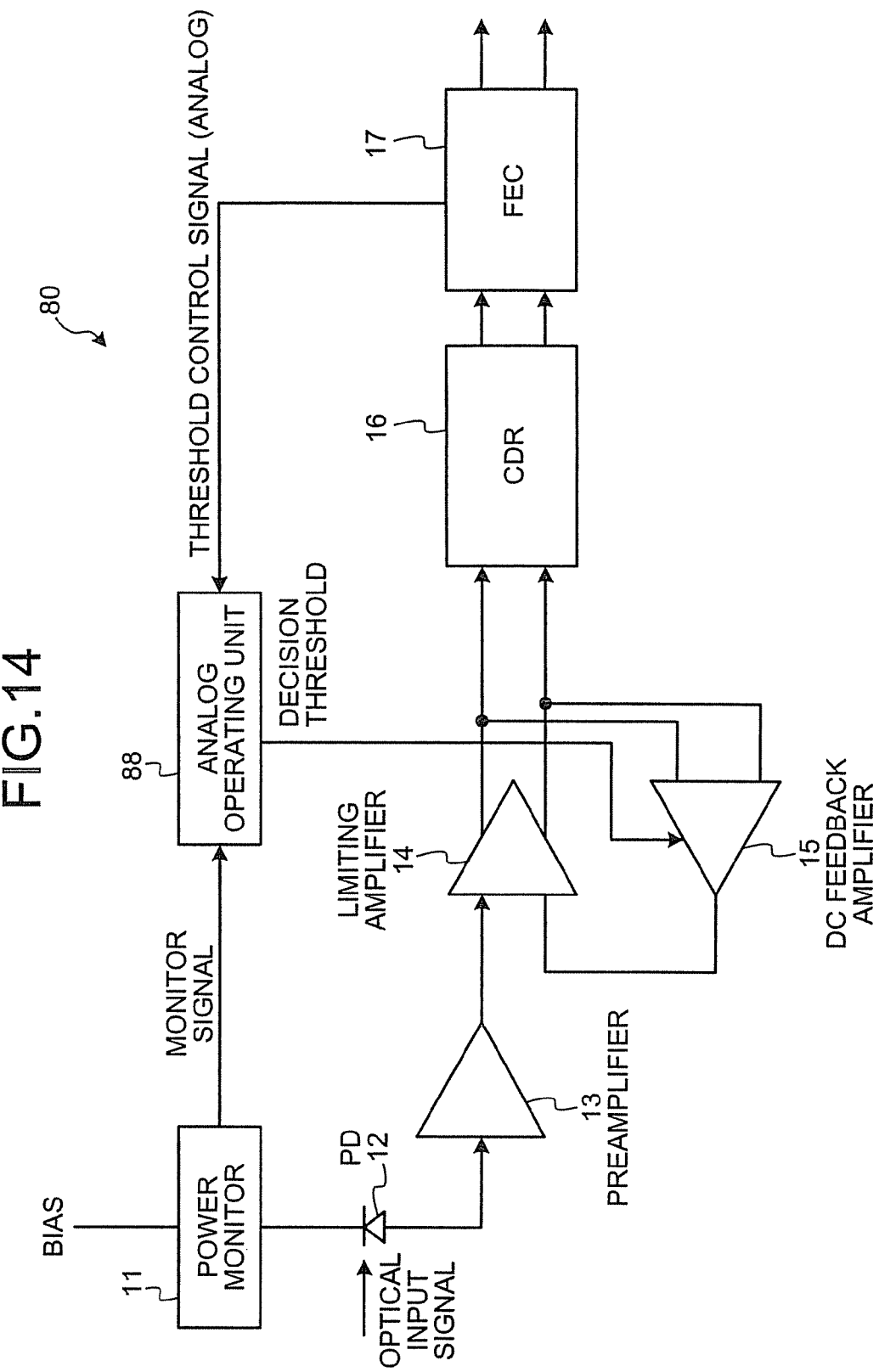
FIG. 14 is a block diagram of an optical receiver according to an eighth embodiment of the present invention.

FIG. 14 is a block diagram of an optical receiver according to an eighth embodiment of the present invention. The configuration of an optical receiver 80 shown in FIG. 14 is similar to that of the optical receiver 10 according to the first embodiment (see FIG. 1), except for including an analog operating unit 88, such as an operational amplifier, instead of the controller 18. The analog operating unit 88 performs an analog processing to set the decision threshold based on the monitor signal and the threshold control signal. With the above configuration, the decision threshold is output as an analog signal from the analog operating unit 88.

Figure 15:
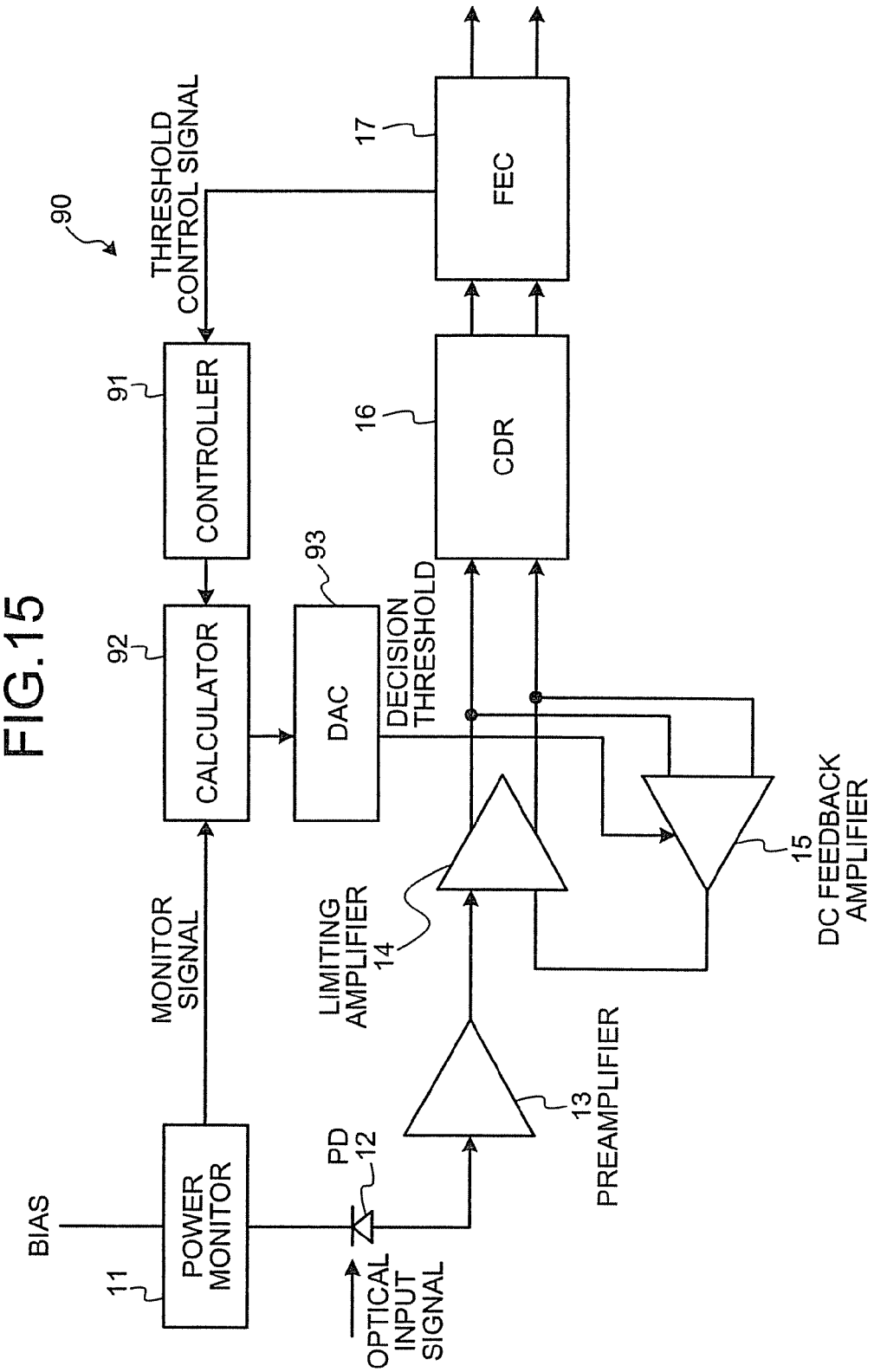
FIG. 15 is a block diagram of an optical receiver according to a ninth embodiment of the present invention.

FIG. 15 is a block diagram of an optical receiver according to a ninth embodiment of the present invention. The configuration of an optical receiver 90 shown in FIG. 15 is similar to that of the optical receiver 10 according to the first embodiment (see FIG. 1), except for including a controller 91, a calculator 92, and a DAC 93 instead of the controller 18. The controller 91 generates a normalized threshold control signal based on the threshold control signal input from the FEC 17. The calculator 92 calculates an optimal decision threshold according to the reception power and the error rate. Specifically, the calculator 92 calculates the optimal decision threshold based on the normalized threshold control signal input from the controller 91 and the monitor signal input from the power monitor 11. The DAC 93 converts the optimal decision threshold output from the calculator 92 from digital to analog, and set the decision threshold to the DC feedback amplifier 15.

Figure 16:
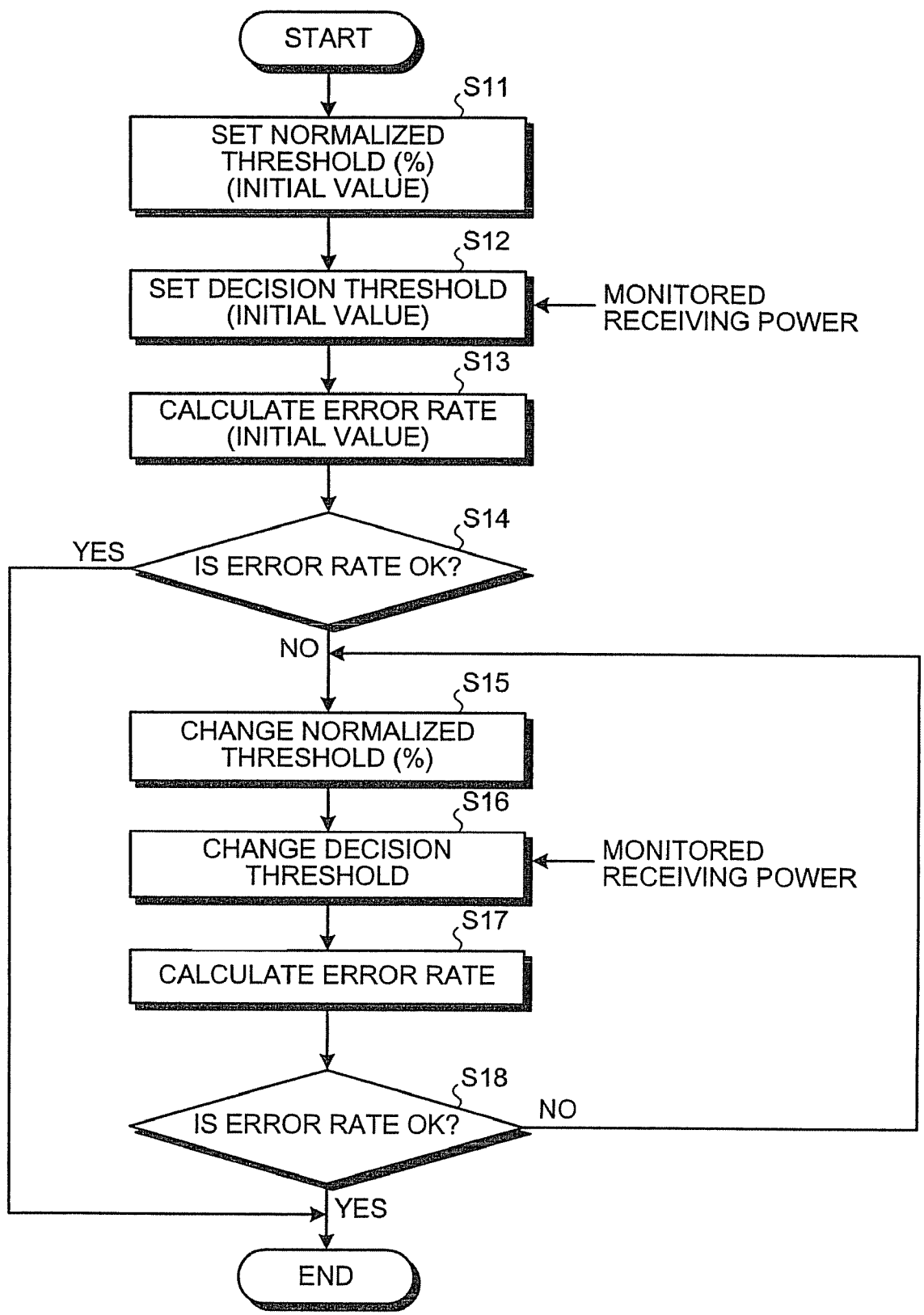
FIG. 16 is a flowchart of a decision threshold setting process according to the ninth embodiment.
Figure 17:
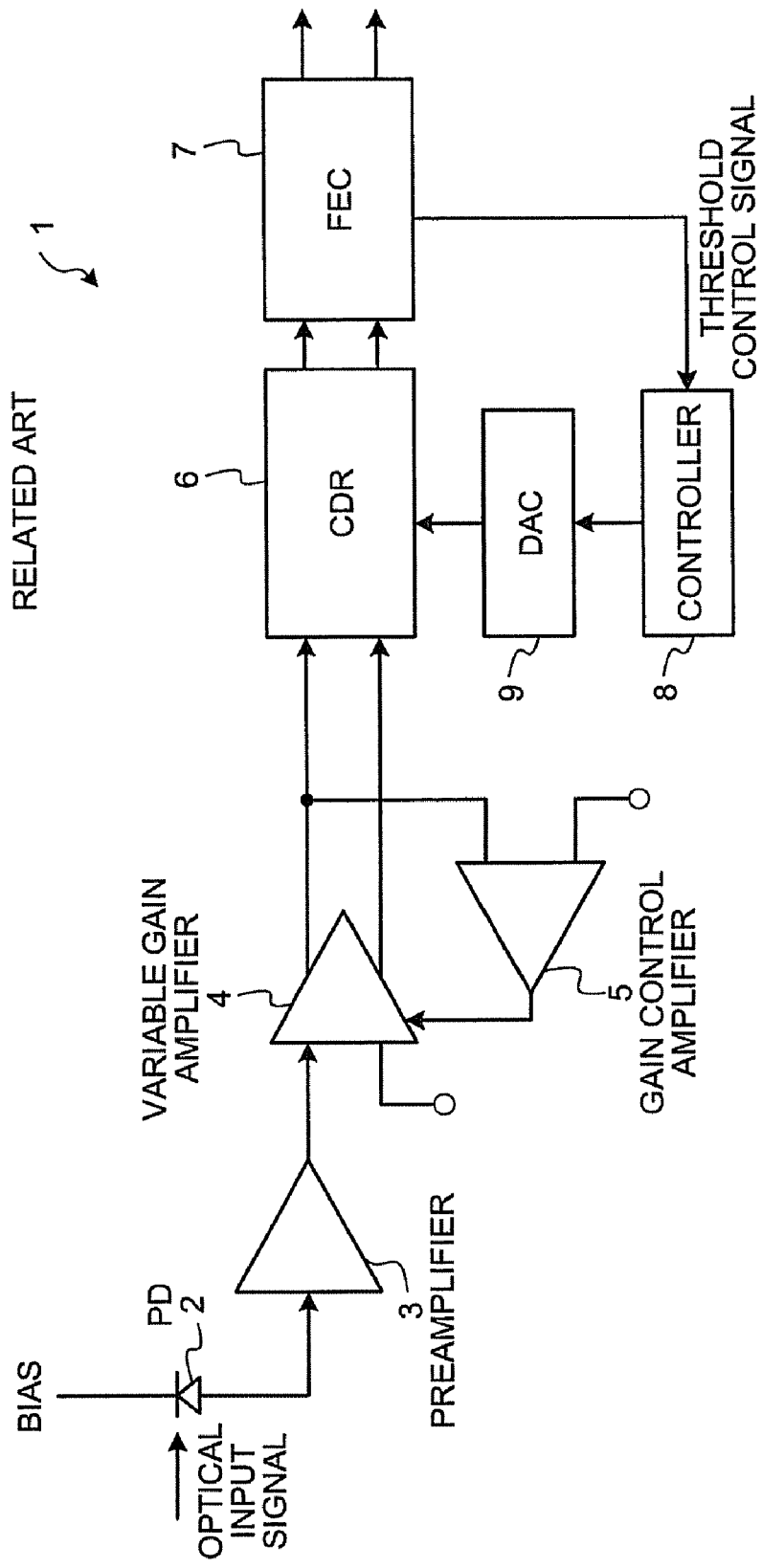
FIG. 17 is a block diagram of a conventional optical receiver.
Figure 18:
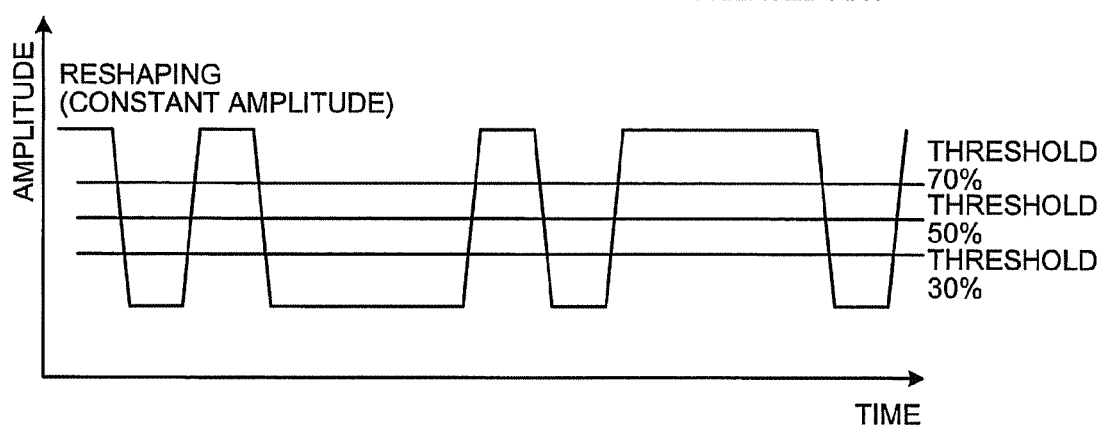
FIG. 18 is a waveform diagram illustrating the output amplitude of the conventional optical receiver.

FIG. 16 is a flowchart of a decision threshold setting process performed by the controller 91 and the calculator 92. The controller 91 sets an initial value of the normalized threshold (step S11). Then, the calculator 92 receives the monitor signal from the power monitor 11, and sets an initial value of the decision threshold (step S12). The calculator 92 calculates an initial value of the error rate based on the initial values of the normalized threshold and the decision threshold (step S13), and determines whether the error rate satisfies a predetermined condition (step S14). When the error rate satisfies the condition ("YES" at step S14), the process is completed.

On the other hand, when the error rate does not satisfy the condition ("NO" at step S14), the controller 91 changes the normalized threshold (step S15). The calculator 92 receives updated monitor signal from the power monitor 11, and changes the decision threshold (step S16). The calculator 92 recalculates the error rate based on the normalized threshold and the decision threshold (step S17), and determines whether the error rate satisfies the condition (step S18).

When the error rate does not satisfy the condition ("NO" at step S18), the process returns back to step S15, and the process from step S15 to step S18 is repeated until an error rate that satisfies the condition is obtained. When the error rate satisfies the condition ("YES" at step S18), the process is completed.

The configuration according to the ninth embodiment is suitable for a case in which the controller 91 and the calculator 92 are separately provided. For example, a module formed by the calculator 92, the DAC 93, and the PD can be mounted on a substrate provided with the controller 91. The controller 18 or the analog calculator according to the first to the eighth embodiments may also be provided as two independent components of the controller and the calculator.

According to the embodiments described above, an optimal decision threshold is set according to the receiving power varying in a wide range, thereby improving the performance of the error correction performed by an optical receiver. Moreover, a high-quality and error-free optical transmission can be achieved by applying a high-gain error correction technology to the highly-sensitive optical receiver with a limiting amplifier.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical receiver comprising:
    a converter that converts an optical signal into an electrical signal;
    an amplifier that amplifies the electrical signal;
    a regenerator that regenerates the electrical signal amplified by the amplifier;
    a corrector that performs correction of an error included in the electrical signal regenerated by the regenerator;
    a monitor that performs monitoring of an optical current flowing through the converter;
    a controller that calculates a decision threshold based on a result of the correction and a result of the monitoring; and
    a feedback amplifier that controls a direct current level of a signal output from the amplifier by branching a part of the signal to be fed back to the amplifier,
    wherein the decision threshold is input to the feedback amplifier.

2. The optical receiver according to claim 1, wherein
    the amplifier is a limiting amplifier that linearly amplifies the electrical signal when the power thereof is less than a given value (linear operation), and otherwise limits the electrical signal (limiting operation), and
    the decision threshold changes according to the power of the electrical signal up to a value unique to each threshold during the linear operation, and remains constant thereafter during the limiting operation.

* * * * *